May 27, 1969 A. BESSLER ETAL 3,446,918

MARKER FOR MULTI-STAGE CROSSPOINT NETWORK

Filed June 23, 1965

Sheet 3 of 3

United States Patent Office 3,446,918

Patented May 27, 1969

3,446,918

MARKER FOR MULTI-STAGE CROSSPOINT NETWORK

Alfons Bessler, Kornwestheim, and Walter Hackenberg, Hirschlanden, Germany, assignors to International Standard Electric Corporation, New York, N.Y., a corporation of New York Filed June 23, 1965, Ser. No. 466,198
Claims priority, application Germany, June 30, 1964, St 22,325
Int. Cl. H04m 9/06; H04q 3/24
U.S. Cl. 179—18 8 Claims

ABSTRACT OF THE DISCLOSURE

A switching network comprising a plurality of cascaded stages is controlled via a guide-wire net by a common marker. Each stage has an individual starting circuit, these circuits being connected into a chain providing a predetermined, timed sequence. A common checking circuit stores a memory of the busy conditions. The starting circuits cause the marker to select and operate a crosspoint in each stage according to the busy conditions stored in the memory.

In larger telephone exchanges, single-stage crosspoint arrangements are uneconomical. Therefore, multi-stage crosspoint arrangements are generally provided connecting a subscriber circuit with a control link. A control link may also be connected with a register or with an outgoing line. Marking circuits known to the art for controlling the switching grids may be the so-called stage markers which are individually associated with the individual switching stages. However, such a marker circuit is only recommendable when all dialling stages are set in parallel. Otherwise, the setting time of the switching stages is relatively long.

The later developments of the crosspoint arrangements lead to quicker route searching methods. For example, the systems are provided with separate route searching networks in which matching occurs, as for example, when the crosspoints are selected with the aid of a so-called guide wire. These crosspoint matching arrangements permit a quick route selection by means of an offering and an accessing process.

An object of the invention is to find a simplified marker for multi-stage crosspoint arrangements.

In particular, an object is to provide telephone exchange switching systems with a quick means for marking a route searching network. A common marker is provided for the successive establishment of a connection through several switching stages. For each switching stage, there is a starting circuit, there is a through-connecting switch associated with the starting circuit and a common checking circuit. The starting circuits actuate the through-connecting switch in a predetermined sequence. The selection and the through-connection of the crosspoint of the respective switching stage is controllable, as determined via the starting circuit. The route searching process is practically only a checking process in each stage. Thereafter, several switching stages are through connected in a timely sequence. The starting circuits control the correct through-connection in the individual switching stages.

According to a particular construction of the marker, the through-connecting switch checks all points of a switching stage with the help of a common checking circuit. In case of trouble, the connecting path may be identified because a storage circuit is provided for each switching stage. These storage circuits can be controlled in compliance with the switching program of the starting circuits. The storages carry out the setting commands for the switching stages. In a crosspoint arrangement with guide wires, these storage circuits lead at a fixed potential to the selected guide wires, and they directly control the through-connection of the corresponding crosspoint. The starting circuits are connected in a locking chain circuit in which each starting circuit blocks the next succeeding starting circuit in the program.

In a switching network with guide wires, the marking circuit becomes particularly simple. When the first starting circuit is initiated by the access potential led to the selected output of the switching network, the further starting circuits are initiated by the access potential, applied to the previously set switching stage. When the marker causes additional checking means to check the through-connected paths, the switching conditions of the storage circuits can be evaluated also to identify the faulty connection.

The above mentioned and other features and objects of this invention and the manner of obtaining them will become more apparent, and the invention itself will be best understood by reference to the following description of an embodiment of the invention taken in conjunction with the accompanying drawings, in which.

Figure 1:
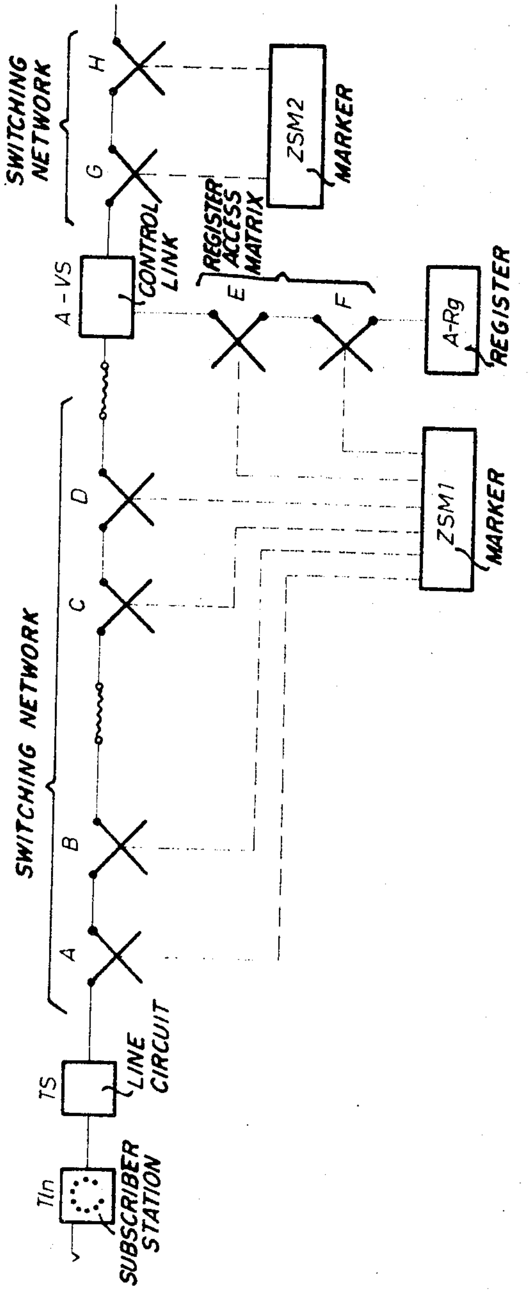
FIG. 1 is a functional block diagram which explains the mode of action carried out by a marker according to the invention.

FIG. 1 shows a telephone exchange system. The subscriber stations T*ln* are connected to individually associated subscriber line circuits TS via the subscriber line. The subscriber station T*ln* may then be connected with a control link A–VS, the connection being made via the four cascaded switch stages A, B, C, D. The register access switching stages E and F place a dial pulse receiving register A–R*g* at the disposal of the link. An intermediate stages marker ZSM1 controls the setting of the control link from the subscriber circuit TS to the dial pulse receiving register A–R*g*.

The intermediate stage marker ZSM1 controls the setting of the switching stages F, E, D, C, B, A. When the subscriber circuit TS goes off hook, the marker selects an available dial pulse receiving register A–R*g* and marks the pertinent output of the switching stage F. After setting the switching stage F, an idle connecting link A–VS is actuated via the switching stage E. This link is thereupon connected with the switching stage A via the stages D, C, and B.

Thus, the intermediate stage marker ZSM1 causes a connection to be established between the dial pulse receiving register A–R*g* and subscriber line circuit TS which is then requiring the register. A similar marking process is carried out by the intermediate stage marker ZSM2 which controls an establishment of a connection of a link A–VS with an outgoing line via the switching stages G and H.

Figure 2:
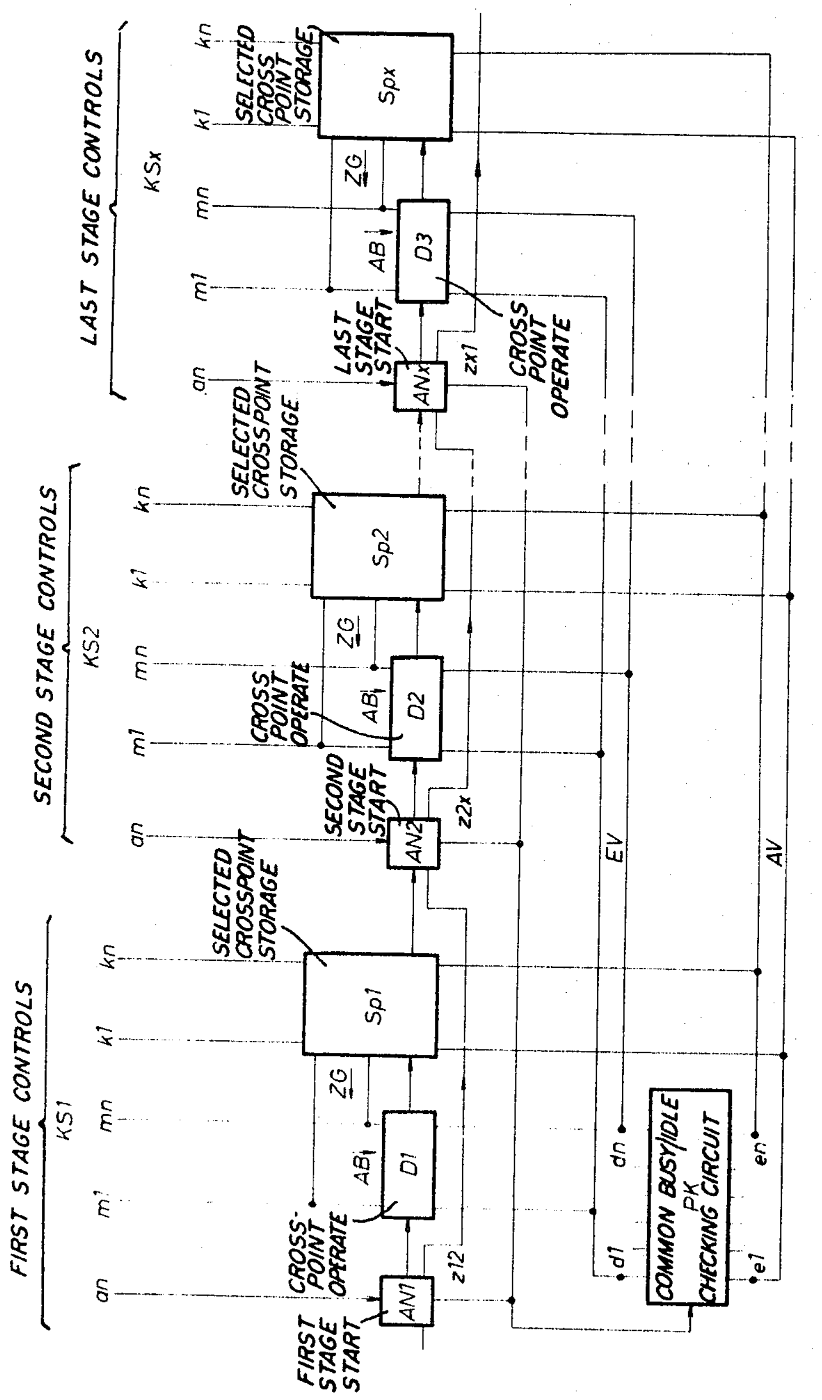
FIG. 2 is a flow chart which shows the cooperation of the control groups in a marker used for the control over a switching network with guide wires.

FIG. 2 shows how a marker can be used according to the invention. For example, the marker may be used as an intermediate stage marker ZSM1 or ZSM2 of the control group. The switching network is equipped with guide wires which run in parallel with the speech and the control wires of the switch path. This guide wire is through-connected, and is marked busy when the pertaining intermediate line is through-connected. To establish a connection, a marking is applied, with the aid of the address of the desired subscriber, to the desired terminal point of a path through the switching network.

An offering potential is applied to the guide wire ending at the desired terminal. This potential spreads like a fan via all idle guide wires of the entire switching network. The offering potential is electronically renewed in each switching stage. Thus, all idle paths are marked at the end of the switching network, and this permits a connection to the marked destination. A quick acting electronic selecting circuit now selects one of the outputs which is marked by the offering potential, and it applies an access potential to the corresponding guide wire.

This selects one of the possible outputs and also the portion of the path or route leading to the next following switching stage. The marker now has the task of selecting one of the routes which is marked in each switching stage and to establish the route sections in a stage by stage manner.

The marker shown in FIG. 2 controls the setting of the switching stages KS1, KS2 to KS*x*. The guide wires *m*1 to *mn* of all switching stages are led to through-connectors D1 to D*x*. The starting circuits AN1, AN2 to AN*x* control the starting and program run-down of the marker. These circuits are interconnected via the locking lines *z*12, *z*2X, *zx*1 so that only one circuit can be in the operative condition at any given time. The sequence is selected at the first starting circuit AN1; then, the starting circuit AN2 operates; and at the end, the starting circuit AN*x* becomes effective. The starting circuits operate in a sequence which is exactly the same as the sequence of the switching stages in the switching network. The starting circuit in each stage is made dependent upon the access potential supplied by the previously set switching stage.

When the output of the switching network has been selected, the starting circuit AN1 through-connects the guide wires *m*1 to *mn* to the common checking circuit PK these connections being made via the through-connecting switch D1. All available guide wires, extending from the selected output, carry the offering potential AB. The checking circuit PK now has to quickly select one of the guide wires bearing an offering potential. This guide wire is marked via the output multiple AV. The storage circuit S*p*1 stores this marking and then the checking circuit PK is released again. The selected guide wire receives the access potential ZG which is regenerated and applied to the following switching stage KS2. The corresponding crosspoint is directly actuated responsive to a potential applied to the corresponding output *k*1 to *kn*. When the storage S*p*1 has completed its function, it releases the starting circuit AN2. The access potential ZG arriving in the switching stage KS2 initiates the starting of the path finding process via the line *an*. The starting circuit AN2 releases the through-connecting switch D2 so that the guide wires *m*1 to *mn* of the switching stage are through-connected in common to the common checking circuit PK.

The available guide wires again conduct the offering potential AB which reaches the checking circuit PK via the through-connecting switch D2 and the input multiple EV. Selection, advancing of the access potential ZG, and through-connection is made in a similar way via the checking circuit PK and the storage S*p*2. This process is repeated in each switching stage, until finally the starting circuit AN*x* becomes effective and the switching stage KS*x* is connected. When the crosspoint of this switching stage is set, the destination is reached at the input of the switching network.

Figure 3:
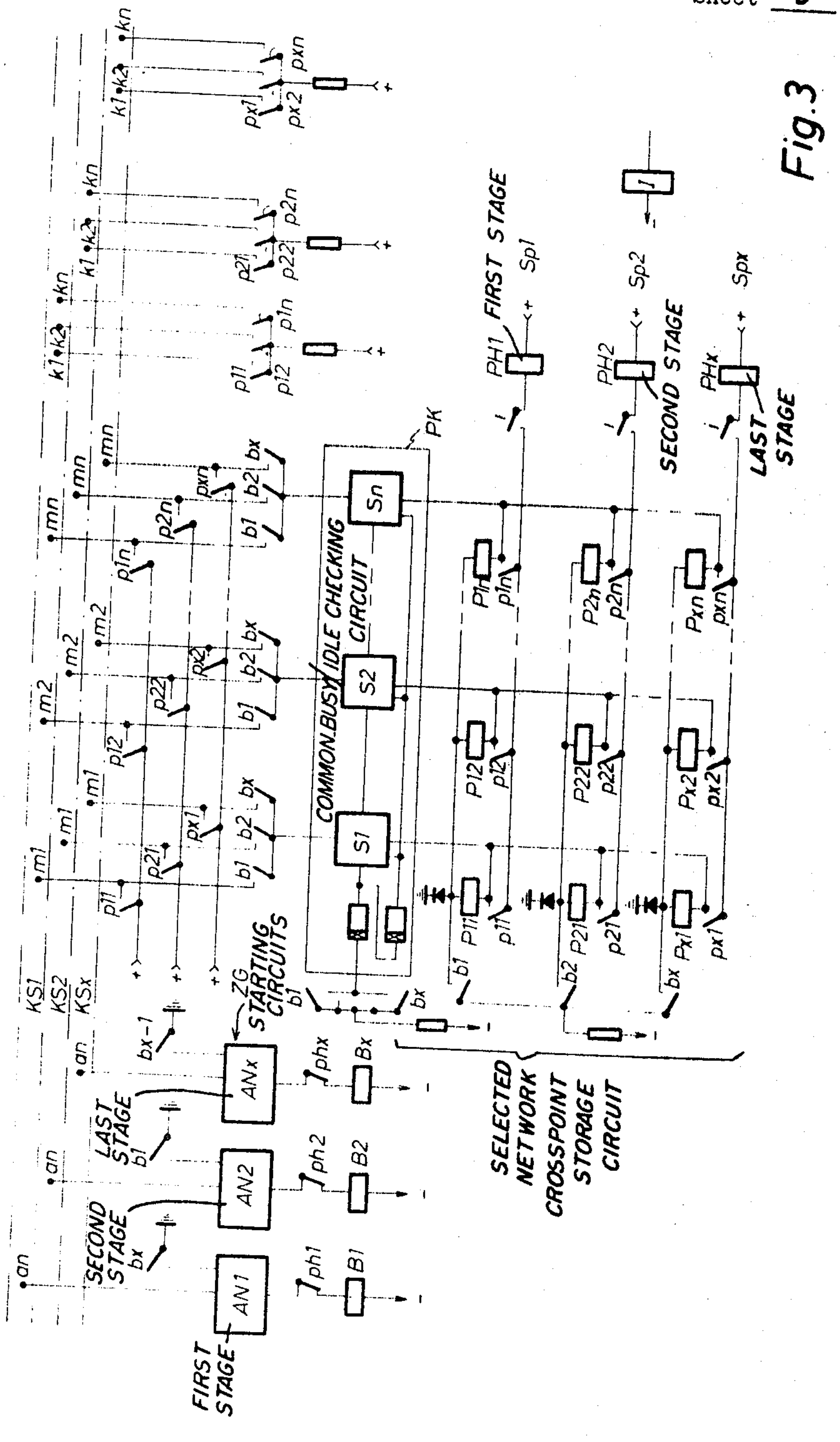
FIG. 3 is a wiring diagram which shows an example of a marker according to FIG. 2.

FIG. 3 shows an example of a marker circuit which is constructed to accomplish the functions disclosed by FIG. 2. The starting lines at the switching stages KS1, KS2, KS*x* lead to the electronic switching means AN1, AN2, AN*x*. These circuits control the seizing relays B1, B2, B*x*. A contact *b*1 at the starting switching means AN2 serves for locking. As long as the seizing relay B1 indicates that the switching stage KS1 is in the operative condition, the switching means AN2 cannot be started. The other contacts marked *b*1 through-connect all guide wires *m*1 to *mn* leading from the switching stage KS1 to the checking circuit PK. The stages S1 to S*n* of the check circuit respond to the negative offering potential. These checking means can be intermeshed in any arbitrary way.

Only one switching means responds, and it marks an available guide wire. Through another contact *b*1, the storage circuit S*p*1 is connected with the relay P11, P12 to P1*n*. When the guide wire *mn* is selected, the relay P1*n* of the storage circuit *sp*1 responds and applies the positive access potential ZG through its contacts *p*1*n* to the guide wire *mn* and the respective cross point via the control lead *kn* leading to the switching stage KS1. After the storage circuit is set (holding circuit *p*1*n*–PH1), the auxiliary relay PH1 responds, and the starting circuit AN1 is disconnected by an operation of contact *ph*1. Contact *b*1 releases the start circuit AN2.

The seizing relay B2 operates, and through-connects the guide wires *m*1 to *mn* of the switching stage KS2. The check circuit PK is again connected. The storage circuit S*p*2 is prepared with the relays P21, P22 to P2*n*. The check circuit PK selects a guide wire of the switching stage KS2 and applies an offering potential to it. The associated storage relay stores the result of selection and controls an application of the access potential and the through-connection of the guide wires of the switching stage KS2 is cancelled, and the selection in the succeeding switching stages is initiated.

Finally, the starting circuit AN*x* is released, and all guide wires *m*1 to *mn* of the switching stage KS*x* are connected via the seizing relay B*x* with the check circuit PK. The setting of the storage relays "P," application of access potential, and through-connection of the corresponding crosspoints is made in the same described way for setting the switching stages KS1 and KS2. With the response of the auxiliary relay PH*x*, the selecting process and the establishment of the connection is completed via the switching stages KS1, KS2, KS*x*. The marker is released, and again free for the next call.

While the principles of the invention have been described above in connection with specific apparatus and applications, it is to be understood that this description is made only by way of example and not as a limitation on the scope of the invention.

What is claimed is:

1. A control for multi-stage network comprising a plurality of crosspoint means for establishing a connection through said stages,
   checking means common to said stages for making busy/idle tests,
   starting means and through connecting means individually associated with each of said stages,
   means included in said starting means for actuating said through connection means in a predetermined sequence to extend circuits from said stages to said common checking means, and
   means comprising said common checking means for selecting one of the circuits extended from said stages.

2. The circuit of claim 1 wherein said circuits comprise guide wires through connected in each of said stages.

3. The circuit of claim 2 wherein said through connection means comprises contact means serially connected between said guide wires and said common checking means, and means for applying an offering potential over said guide wire to said common checking means via said contact means.

4. The circuit of claim 3 and storage means associated with each of said stages for storing an access potential received from said common checking means,
   means for controlling said storage means responsive to the switching sequence of said starting means, and
   means responsive to said access potential in said storage means for commanding the establishment of connections through said network.

5. The circuit of claim 4 and means whereby said access potential is passed over said selected guide wires for actuating selected crosspoints responsive to said access potential in said storage means.

6. The circuit of claim 1 and means whereby said starting circuits are arranged in a locking chain circuit, and means whereby each of said starting circuits locks the program rundown of the succeeding starting circuits.

7. The circuit of claim 1 and a plurality of guide wires extending through said network, and means for operating said starting circuit responsive to access potentials applied from the previously operated switching stage.

8. The circuit of claim 7 and means for operating the first starting circuit responsive to an access potential applied via selected network outlet.

References Cited

UNITED STATES PATENTS

| | | | |
|---|---|---|---|
| 2,911,477 | 11/1959 | Gohorel et al. | 179—22 X |
| 3,180,940 | 4/1965 | Korber | 179—22 X |
| 3,310,633 | 3/1967 | Schonemeyer | 179—18.7 |

WILLIAM C. COOPER, *Primary Examiner.*